US 6,626,397 B2

(12) United States Patent
Yifrach (10) Patent No.: US 6,626,397 B2
(45) Date of Patent: Sep. 30, 2003

(54) AUTONOMOUS FLYING WING (75) Inventor: Aharon Yifrach, Ashkelon (IL)

(73) Assignee: Elsbit Technologies Ltd., Tel Aviv (IL)

( * ) Notice: Subject to any disclaimer, the term of this patent is extended or adjusted under 35 U.S.C. 154(b) by 29 days.

(21) Appl. No.: 09/895,332

(22) Filed: Jul. 2, 2001

(65) Prior Publication Data

US 2003/0001045 A1 Jan. 2, 2003

(51) Int. Cl.[7] .................................................. B65C 3/00
(52) U.S. Cl. ..................... 244/35 R; 244/13; 244/49; 244/76 R; 244/190; 244/900; 244/901
(58) Field of Search ............................... 244/35 R, 13, 244/49, 76 R, 190, 900, 901

(56) References Cited

U.S. PATENT DOCUMENTS 4,605,183 A * 8/1986 Gabriel ........................ 244/46
5,474,257 A * 12/1995 Fisher et al. .................. 244/49

* cited by examiner

Primary Examiner—J. Woodrow Eldred
(74) Attorney, Agent, or Firm—G. E. Ehrlich (1995) Ltd.

(57) ABSTRACT

An unmanned flying vehicle comprises an autonomous flying wing having at least two wing portions arranged substantially symmetrically about a center portion. Each wing portion is pivotally attached to each adjoining portion such that the wing portions are foldable for storage and openable for deployment. A preferred form is the so-called seagull wing having four wing portions. The vehicles may be programmable from a mother aircraft whilst being borne to a deployment zone using a data link which may be wireless.

22 Claims, 6 Drawing Sheets

AUTONOMOUS FLYING WING

FIELD OF THE INVENTION

The present invention relates to an autonomous flying wing or like unmanned aerial vehicle and more particularly but not exclusively to an autonomous flying wing or like unmanned aerial vehicle which is collapsible for storage and delivery.

BACKGROUND OF THE INVENTION

It is often necessary to survey regions of the earth's surface from the air, for example when looking for survivors of lost ships or aircraft, or following earthquakes or natural disasters.

Aerial reconnaissance is as old as flight itself but large-scale reconnaissance is generally limited by the availability of manpower and aircraft. Furthermore it is expensive to keep a manned aircraft in the air, and in certain circumstances it may even be particularly dangerous, for example if the reconnaissance is being carried out over enemy territory.

Thus, in recent years, unmanned aerial vehicles and micro-vehicles such as the autonomous flying wing have been developed. The autonomous flying wing is much smaller than a conventional aircraft because it does not have to carry a human pilot. Although it is powered, its power requirements are considerably lower than any conventional aircraft and its manufacturing cost is orders of magnitude lower. It is generally delivered to a deployment zone by a conventional aircraft, following which it is released and, because of its small size and low cost, it can be deployed in much larger numbers than has heretofore been possible.

Nevertheless, one of the limitations in the use of an autonomous flying wing is ease of deployment, in particular the number of such flying wings that can be deployed from a single conventional aircraft or that can be stored in a single conventional underwing pod.

SUMMARY OF THE INVENTION

Embodiments of the present invention provide an autonomous flying wing or like unmanned aerial vehicle with collapsible wings, which is inexpensive, can be packaged in small containers and can be released, for example, from an aircraft in great numbers to perform a plurality of missions. The containers may typically be pods for underwing storage in a conventional aircraft.

According to a first aspect of the present invention there is thus provided an autonomous flying wing comprising at least two wing portions arranged substantially symmetrically about a center portion, each wing portion being pivotally attached to each adjoining portion such that the wing portions are foldable for storage and openable for deployment.

Preferably there are at least four wing portions arranged substantially symmetrically about the center.

Preferably, each wing portion is substantially rigid.

Preferably there is also an automatic deployment device operable to automatically unfold the wing portions upon deployment.

Preferably, the automatic deployment device comprises at least one actuator operable to rotate the wing portions about the pivotal connections.

According to a second aspect of the present invention there is provided a method of storing, delivering and deploying a plurality of autonomous flying wings comprising pivotally connected substantially rigid wing parts, the method comprising the steps of
  folding the flying wings about pivotal connections between wing parts,
  storing the folded flying wings in a container,
  placing the container on a conventional aircraft,
  delivering the container, on the conventional aircraft, to a deployment zone, and
  extracting each flying wing from the container whilst unfolding the flying wing, thereby to deploy the flying wing.

Preferably, the container is an underwing pod.

According to a third aspect of the present invention there is provided an unmanned aerial vehicle comprising:
  a central portion having a front, a front portion, a medial portion an aft portion and an aft; and
  at least two deployable wing elements being pivotally connected one on each side of the central portion, the deployable wing elements being openable from a collapsed undeployed state, in which they are inoperative, to an extended deployed state, in which they are operative, and wherein the deployable wing elements are rigid.

According to a fourth aspect of the present invention there is provided an autonomous flying wing comprising a controller for controlling the flight thereof, the autonomous flying wing being borne in a deployable manner by a mother aircraft to a deployment zone, the wing being connected via a data link to an input device in the mother aircraft such that the controller is preprogrammable from the mother aircraft whilst being borne to the deployment zone.

A preferred embodiment includes a central portion and at least two wing portions, each wing portion being pivotally attached to each adjoining portion such that the wing portions are foldable for storage and openable for deployment.

Preferably, the data link is a wireless data link.

Preferably, the wireless data link is any one of a group comprising an infra-red link, an RF link and a microwave link.

Preferably, the wing is stored as one of a plurality of flying wings in a storage device mounted on the mother aircraft, and the data link includes an addressing unit operable to address each flying wing independently. The wings can thus be addressed singly, or in predefined groups or as a whole.

Preferably, the processor is operable to arrange data from the input device into a mission plan for the flying wing.

According to a fifth aspect of the present invention there is provided a method of aerial screening of a land or sea region, comprising
  providing a plurality of unmanned collapsible flying wings in a collapsed configuration,
  bearing the flying wings packed together in a container to a deployment zone,
  launching the container,
  deploying the collapsible flying wings from the container,
  opening the collapsible flying wings
  allowing the flying wings to automatically navigate to screen the region through different types of sensors.

According to a sixth aspect of the present invention there is provided a method of aerial screening of a land or sea region comprising the steps of providing a plurality of collapsible flying wings in a collapsed state on an airborne platform,
  releasing the plurality of unmanned aerial vehicles from the airborne platform whilst at the same time unfolding into an operational state, and allowing the plurality of unmanned aerial vehicles to navigate so as to screen the region.

BRIEF DESCRIPTION OF THE DRAWINGS

For a better understanding of the invention and to show how the same may be carried into effect, reference will now be made, purely by way of example, to the accompanying drawings, in which.

DESCRIPTION OF THE PREFERRED EMBODIMENTS

Figure 1:
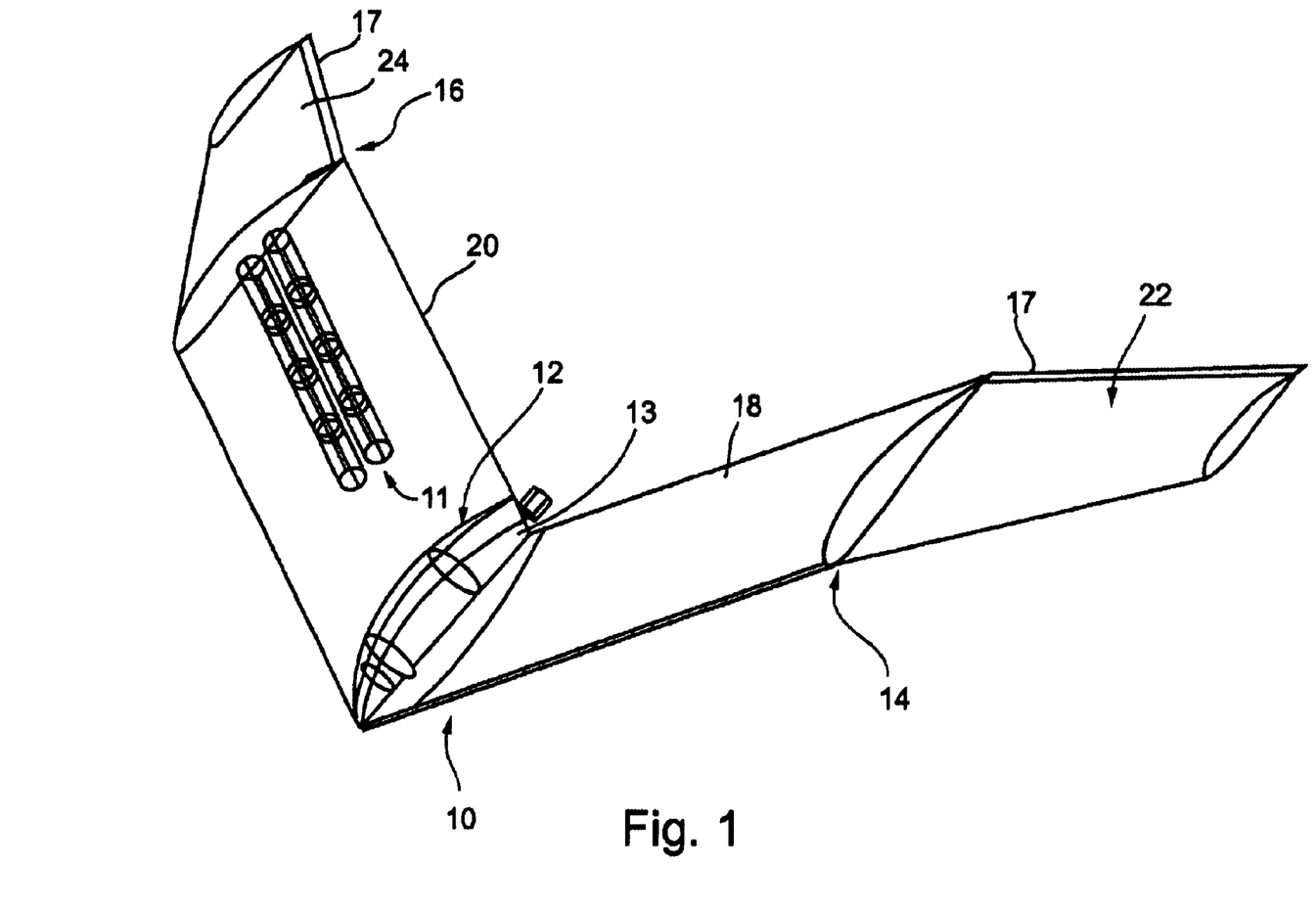
FIG. 1 is a simplified perspective view of a flying wing to which the present invention may be applied.

Reference is now made to FIG. 1, which is a simplified perspective view from above of an autonomous flying wing 10 to which the present invention may be applied. The wing 10 comprises a central portion 12, which typically includes an engine 13, and a controller (not shown). The controller may be a programmable computer and more particularly an avionics control and command center as is well known in the art of unmanned aerial vehicles. The wing may typically also include sensors and other devices, as necessary for the mission, which are preferably operated by the controller.

According to a preferred embodiment of the present invention, the controller controls the operation of the flying wing 10, as well known in the art of unmanned aerial vehicles. The controller can be preprogrammed, such that no remote control is required. The controller can alternatively communicate with a remote station via a receiver for receiving operational commands, which are then translated into control commands, affecting the performance, e.g., flight course, of the flying wing 10. To this end, wing 10 is preferably equipped with an antenna (not shown) operatively communicating with the receiver. The antenna is preferably connected to ailerons 17.

The controller is preferably in control of the folding and unfolding process of the wings, as will be discussed below, however local control is also applicable. The controller preferably includes a transmitter for real-time reporting to a remote station, which remote station can be air-borne. The controller effectively controls the operation of any payload and other components and functions of autonomous flying wing 10.

On either side of the central portion, 12, are wing halves 14 and 16. In the embodiment of FIG. 1 each wing half is formed of two wing portions, an inner wing portion 18, 20, and an outer wing portion 22, 24. In the configuration shown the inner wing portions 18, 20 are angled gently upwardly and the outer wing portions 22, 24, are angled gently downwardly. Such a configuration is known as a seagull wing and has particularly aerodynamically favorable characteristics. However, the skilled person will appreciate that the invention is not limited to such a configuration, and may equally well include wing portions being placed at different angles or wherein the entire wing is substantially planar.

The engine 13 preferably operates a driving mechanism, not shown but also located in the central portion 12. The drive mechanism is operatively held by the central portion 12 and serves for providing the autonomous flying wing 10 with a drive force. The drive mechanism can be located anywhere within the central portion 10, however, according to a presently preferred configuration, the drive mechanism is located aft.

The engine 13 is preferably an electrical motor, however, liquid-fuel operated motors are also envisaged. To power the engine, autonomous flying wing 10 further includes a power source, which serves for powering the engine 13. The power source can include, for example, a plurality of electrically connected batteries, which can be distributed at various locations along the wings 14 and 16 to provide autonomous flying wing 10 with a required weight balance and to efficiently employ the small space within the autonomous flying wing 10. The drive mechanism may, in one preferred embodiment, be a propeller.

In one embodiment, there is provided a non-motorized air gliding autonomous flying wing. Such air gliding autonomous flying wings 10 can be dropped from an airplane or other air-borne platform at medium to high altitude (e.g., about 20,000 feet) and glide for long distances for several hours.

According to a preferred embodiment of the present invention, autonomous flying wing 10 includes a payload. Any payload can be used, one example is a camera.

Figure 2:
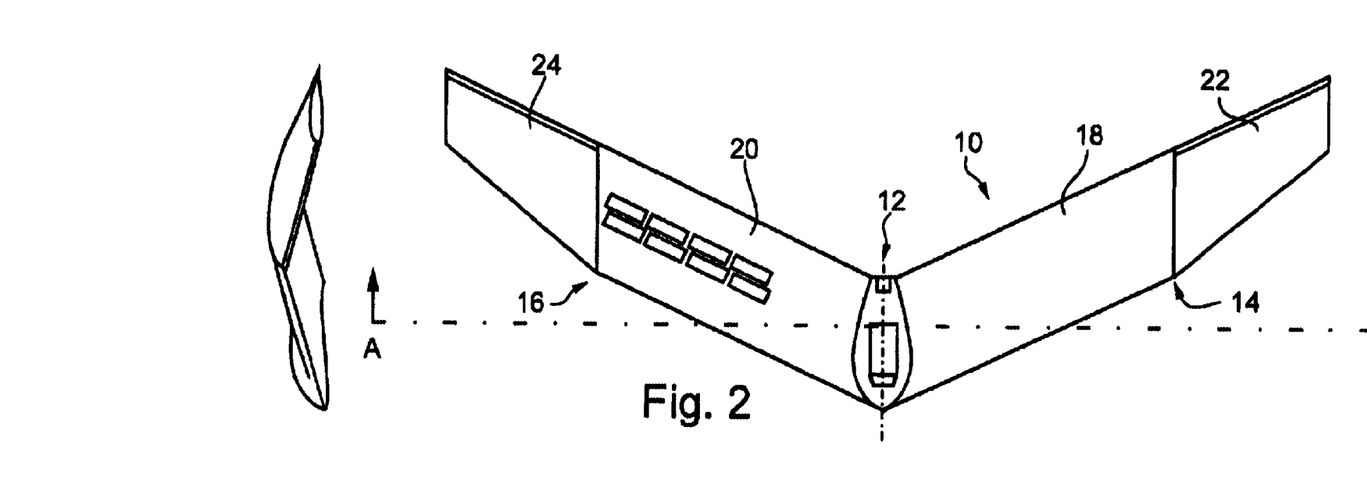
FIG. 2 is a simplified view from above of the wing of FIG. 1.

According to preferred embodiments, the overall weight of wing 10 is between 3–7 Kg, it operates at about 30–80 km/hour, at altitude of 0–7000 m, for 3–15 hours non-stop. Reference is now made to FIG. 2, which is a simplified view from above of the wing 10 of FIG. 1. Parts that are identical to those shown above are given the same reference numerals and are not referred to again except as necessary for an understanding of the present embodiment.

FIG. 2 shows the swept back configuration of the wing 10. Inner wing portion 18 is pivotally connected to central portion 12 at one end and to outer wing portion 22 at the other end. Likewise, inner wing portion 20 is pivotally connected to central portion 12 at one end and to outer wing portion 24 at the other end.

Figure 3:
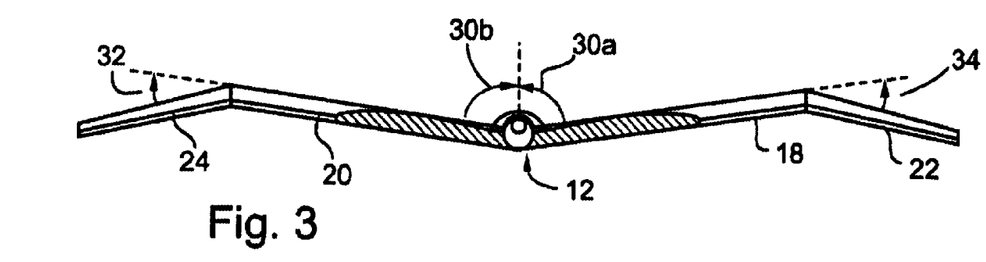
FIG. 3 is a simplified view from behind of the wing of FIG. 1.
Figure 4:
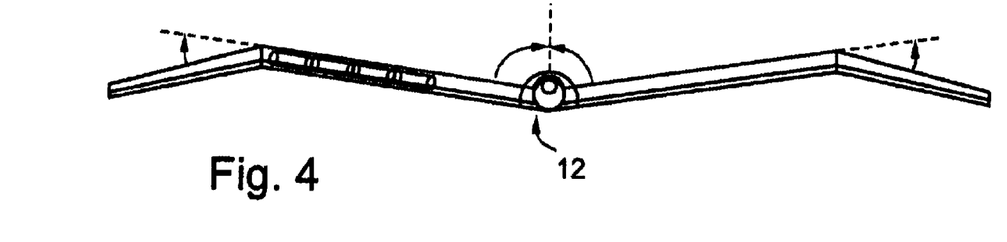
FIG. 4 is a simplified view from in front of the wing of FIG. 1, FIGS. 5a to 5c are simplified schematic diagrams showing how the wing of FIG. 1 may be folded away for storage.

Reference is now made to FIGS. 3 and 4, which are simplified views from in front and behind respectively of a wing 10 according to FIG. 1. Parts that are identical to those shown above are given the same reference numerals and are not referred to again except as necessary for an understanding of the present embodiment. In FIGS. 3 and 4, the angles at which the wing portions are able to pivot with respect to each other are shown by arrows. Arrow 30a indicates how wing portion 18 pivots around central portion 10 to a substantially vertical position, and arrow 30b shows how inner wing portion 20 pivots around central portion 10, also to a substantially vertical portion, such that the two central portions lie on top of each other when folded. Outer wing portion 24 pivots, as indicated by arrow 32, so that it is aligned with inner wing portion 20, and likewise, outer wing portion 22 pivots, as indicated by arrow 34, so as to align with inner wing portion 18, so that the two outer wing portions also lie on top of each other and form a linear continuation of the two inner wing portions 18 and 20. Thus, the wing may be folded from a seagull orientation to a straight-line orientation having a length which is half that of the total length of the wings when held flat and a thickness twice that of an unfolded wing, the depth remaining unchanged.

It will be appreciated that, as an alternative, the outer wing portions 22 and 24 could be folded back on the inner wing portions 18 and 20 respectively and this would reduce the folded length. However, this would give a thickness of four times the initial wing thickness over part of the length and, as will be seen below, such a configuration is not optimal for stowage.

Figure 5A:
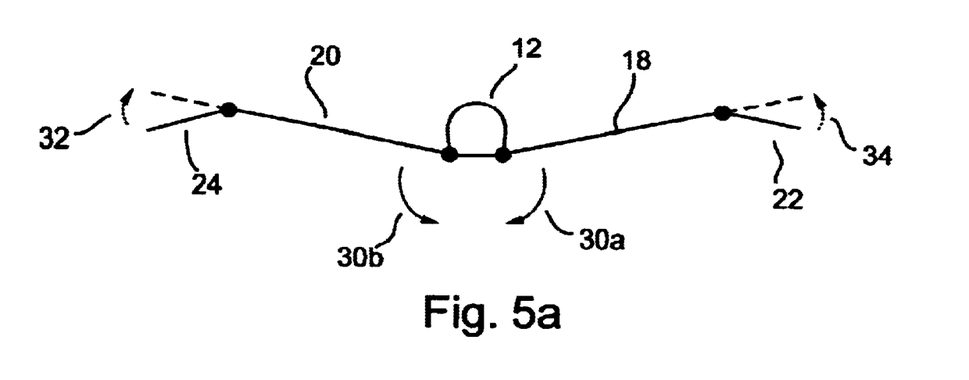
Figure 5B:
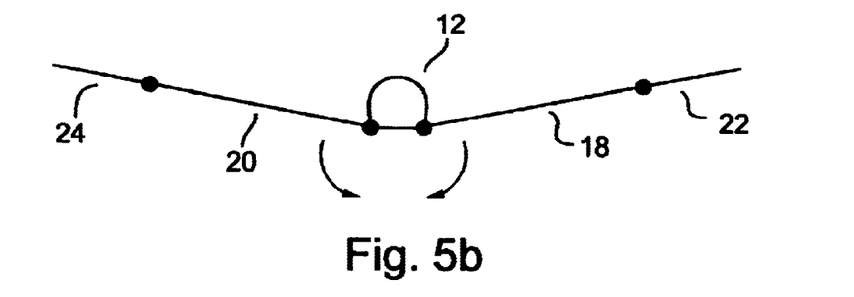
Figure 5C:
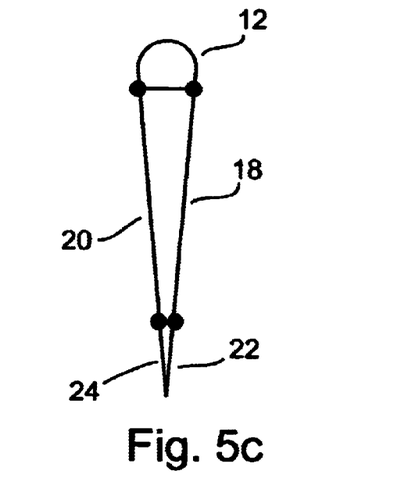

Reference is now made to FIGS. 5a to 5c, which are simplified schematic diagrams showing the folding process described with respect to FIGS. 3 and 4. Parts that are identical to those shown above are given the same reference numerals and are not referred to again except as necessary for an understanding of the present embodiment. In FIG. 5a, the wing 10 is shown in the seagull configuration. In FIG. 5b the wing 10 is shown in an intermediate state with the inner wing portions 18 and 20 folded together and the outer wing portions 22 and 24 still unfolded. In FIG. 5c, the outer wing portions 22 and 24 are also folded, forming a single straight unit, which is half the length of the flat wing, although longer than half the wingtip-to-wingtip length in the seagull configuration.

In a particular embodiment of the seagull configuration, a total wingtip-to-wingtip length of 2.14 m gives a total folded length of 1.20 m.

Figure 6A:
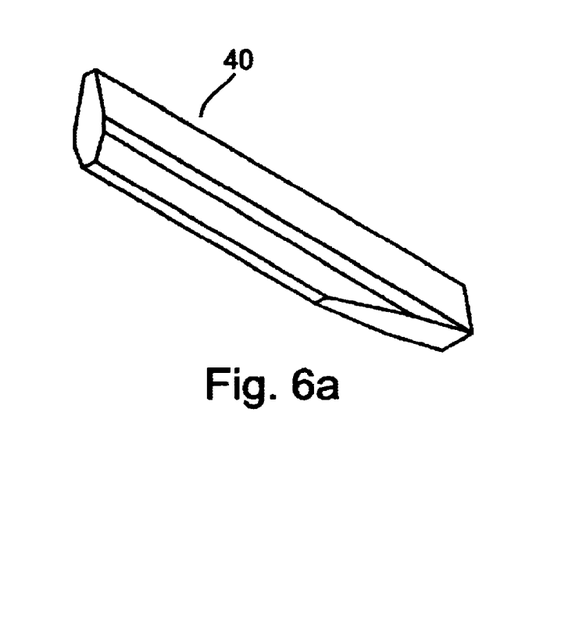
FIGS. 6a to 6c are simplified schematic representations from different angles of a container for containing the wing of FIG. 1.
Figure 6B:
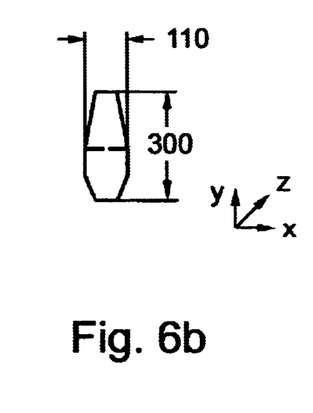
Figure 6C:
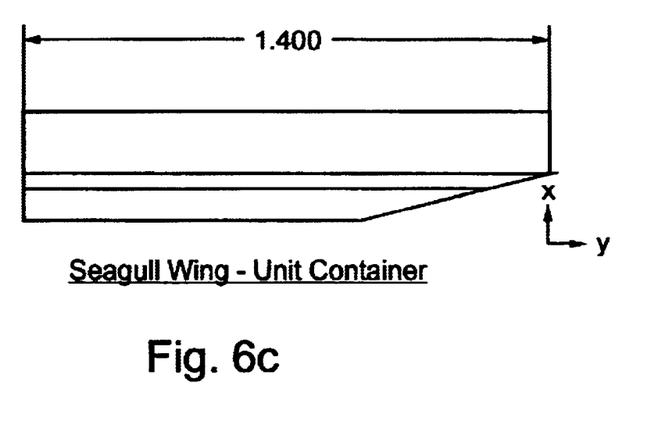

Reference is now made to FIGS. 6a–6c, which are simplified views of a storage unit 40 for storing a folded autonomous flying wing of the type described above. FIG. 6a is a simplified side perspective view of the storage unit 40. FIG. 6b is a front view of the storage unit 40 and FIG. 6c is a side view thereof. The storage unit 40 is an irregular octagon, and as orientated with respect to FIG. 6b, the octagon is flattened in the x-axis, extended in the z-axis, and in the y direction, it is extended in the positive y direction and flattened in the negative y direction. The angles of the walls in the negative y direction are selected to define a segment of a circle, so as to assist in storage, as will be described below. In the z direction (the x direction of FIG. 6c) the device is tapered towards one end.

The storage unit 40 is thus shaped to contain the folded wing, and is designed to be placed radially with other storage units in a compartment of an underwing pod of a conventional aircraft, as will be described below. A release mechanism, which may be part of the autonomous flying wing stored therein or of the storage unit 40 or of the pod, opens the storage unit to expel the wing therefrom during deployment.

In the numerical example given above, wherein the wing had a total folded length of 1.20 m, typical dimensions for the storage unit 40 might be 0.30 m×0.11 m×1.40 m.

Figures 7, 8:
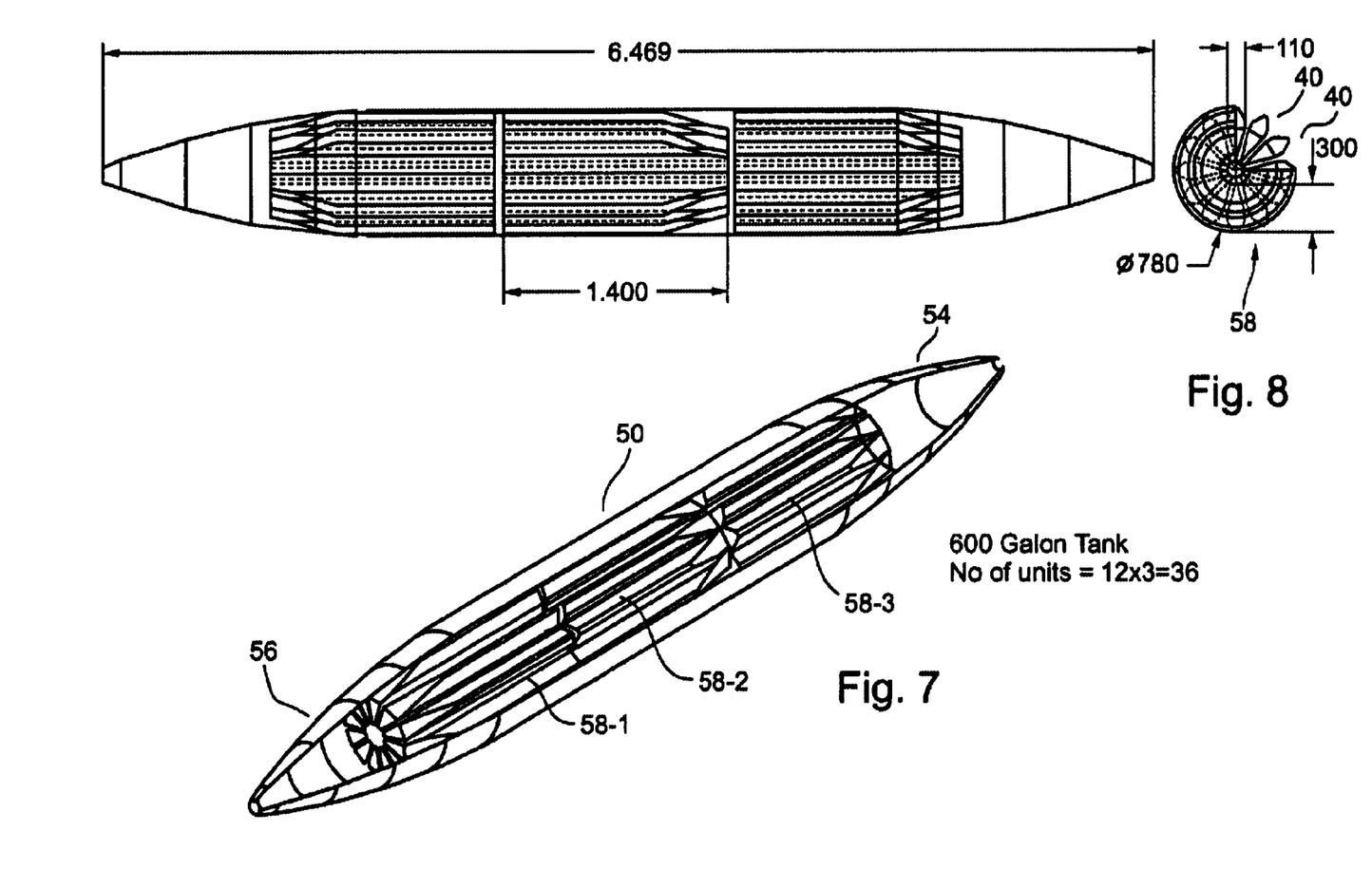
FIG. 7 is a cutaway diagram of an underwing pod for carrying a plurality of containers of the type shown in FIG. 6.
FIG. 8 is a cross-section of the pod of FIG. 7, showing how a series of containers are arranged radially within the pod.

Reference is now made to FIG. 7, which is a simplified cutaway perspective view of an underwing pod 50 for use with a conventional aircraft. The pod comprises a generally cylindrical outer shell 52 having elongated front and rear ends 54 and 56 and a hollow interior space for storage. A first plurality of containers 40 are preferably arranged radially around the center of the pod, at a forward end, as indicated by reference numeral 58-1. Further sets of radially arranged containers, 582 and 58-3 can be arranged further back along the pod 50. Using the numerical dimensions given with respect to FIG. 6c, and a standard 600-gallon pod, a total of 12 containers 40 may be arranged radially together and three sets of radial arrangements 58 can be fitted lengthwise in the pod 50 giving a total of 36 autonomous flying wings per pod 50. Additional space at the rear end 56 of the pod 50 may store air-braking devices such as a parachute (not shown).

Reference is now made to FIG. 8, which is a front view of a set of containers 40 radially arranged within a pod 50. Parts that are identical to those shown above are given the same reference numerals and are not referred to again except as necessary for an understanding of the present embodiment. FIG. 8 shows how the shape of the containers 40, as described in respect of FIGS. 6a to 6c, allows them to be fitted in such a way that optimal use is made of the cylindrical space within the pod.

In use, the autonomous flying wings 10 are folded and placed inside containers 40. The containers 40 are then placed inside a pod 50, as described with respect to FIGS. 7 and 8 and the pod is mounted on the underwing of a conventional aircraft for deployment. The conventional aircraft reaches a deployment zone and deploys the autonomous flying wings in any one of a number of ways known to the skilled person.

In one preferred embodiment, deployment of the flying wing comprises the following steps:

1) the entire pod is released from the underwing;
2) a parachute, attached to the pod, opens;
3) the cylindrical outer covering of the pod is released, this may typically be spring activated, or activated by action of the parachute or may be caused by inflation of an air pillow or the like;
4) the containers are then given a chance to disperse;
5) a small explosive charge breaks open each container and unfolds the autonomous flying wing therein, and
6) the controller and the engine 13 of each flying wing is started.

Some of the above processes may be initiated by air pressure. Alternatively, they may be initiated in accordance with preprogrammed time delays.

In greater detail, pod 50 is preferably equipped with an air brake device such as a deployable parachute in its rear end 56. Launching of autonomous flying wing 10 is effected by dropping pod 50 from the conventional aircraft, launching it from a surface launcher or hand launching it from the surface (e.g., ground). It will be appreciated by the skilled person that in all cases where an entire pod 50 is launched, it is also possible to launch a single container 40. A string connected at one end to the pod 50, and at its other end to the conventional aircraft etc. operates a release mechanism to automatically deploy the parachute. As a result, one end of the pod faces downwards as the cylindrical covering is released. Dispersal of the containers 40 may be effected by a combination of gravity and wind resistance and may be assisted by the explosion of a small charge. When dispersing, a mechanism, which may be based on time delay or on air pressure or the like, opens the containers 40. When the flying wing is released from the container, a mechanism, such as a string mechanism operated by the opening of the container 40, operates the controller of the flying wing 10.

The first task of the controller is to unfold the wing. The pivotal connections are preferably motorized and the controller operates actuators to rotate the wing sections about their pivotal connections until the seagull configuration is attained. Latches preferably fix each joint in position once the desired configuration is reached.

The controller may typically be preprogrammed with a mission such as "carry out a photographic survey of the region between map references A and B". Often it is possible to program each autonomous flying wing individually before take-off or by radio contact after deployment but in certain circumstances final details may be available only whilst delivery is taking place and radio contact may be inconvenient or not possible. Thus, one embodiment of the present invention provides in-flight programming of an autonomous flying vehicle or flying wing, including an autonomous micro-vehicle, from the cockpit of the delivery aircraft. Such programming may be carried out via a data link between the cockpit and the underwing pod 50. The link may be hardwired. Alternatively, in one preferred embodiment the link is wireless.

Figure 9:
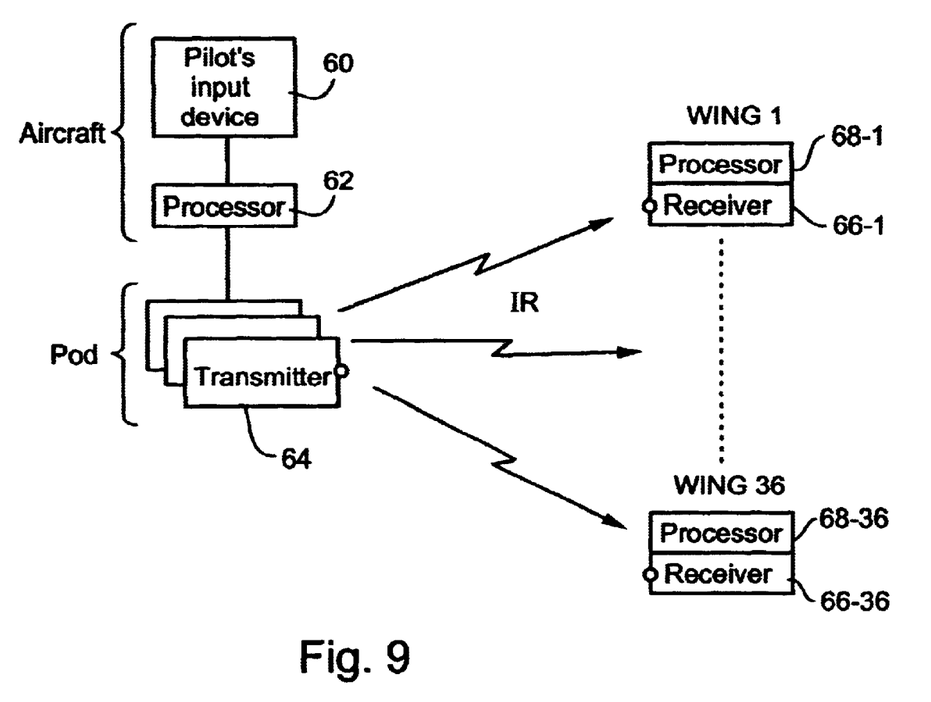
FIG. 9 is a generalized block diagram of a wireless data link between a container or pod on a carrier aircraft and between the container and a plurality of flying wings.

Reference is now made to FIG. 9, which is a simplified block diagram of a programming connection utilizing a wireless link, operative in accordance with a preferred embodiment of the present invention. An input device 60 is located in the cockpit or other manned location on the conventional aircraft, allowing the pilot or other crew member to input data for programming as part of the mission. A processor 62 is connected to the input device and processes input data from the input device 60, together with any other relevant data, into a mission blueprint for one or more of the flying wings 10.1 . . . 10.*n*. The mission blueprint is then modulated for transmission via a wireless transmitter 64, which is preferably externally mounted on the pod. The transmitter 64 may be an infrared, microwave, RF or any other suitable transmitter and a corresponding receiver 66 may be placed on each wing for receipt and demodulation of the blueprint. The blueprint preferably contains addressing information, which may be decoded at addressing logic 68 within each wing. The addressing logic preferably allows the intended flying wing or wings 10.0 . . . 10.*n* to identify those messages intended therefor and to ignore those messages not intended therefor. The decoded address may sometimes specify more than one flying wing 10.0 . . . 10.*n*. Preferably, the addressing logic 68 may comprise a rejection gate located at each flying wing, which simply rejects messages not correctly addressed, the receiver sending all blueprints to all wings 10.0 . . . 10.*n*.

In the event that several pods are being used, a preferred embodiment simply sends all data to each pod and each respective transmitter transmits all of the data, leaving the individual wings to determine which messages are relevant. Thus there is achieved integrated operation of wings from a plurality of pods.

The transmitter preferably uses IR with a high frequency carrier and low frequency modulation, thereby overcoming problems due to fading and interference.

Thus, a programmer based on the aircraft is able to program the flying wings in flight and prior to deployment. As mentioned above, the pod is preferably arranged such that a single program can be sent to all of the flying wings or alternatively so that the flying wings can be addressed individually or in groups.

Typical applications for flying wings include civilian and military reconnaissance missions. The reconnaissance missions may include nighttime reconnaissance using FLIR or image intensifier apparatus.

According to a further embodiment of the present invention there is provided a method of aerial screening of a land or sea region. The method is effected by implementing the following method steps. In a first step, a plurality of unmanned collapsible flying wings are provided in a collapsed configuration in a pod and borne by a conventional aircraft to a deployment zone. Alternatively, they may be borne to the deployment zone in other ways, as mentioned above. Then, the pod is launched and the collapsible flying wings are opened and deployed from the pod, to enable each of the plurality of collapsible flying wings for airborne use. Finally, the plurality of unmanned aerial vehicles navigates to screen the region through different types of sensors. It will be appreciated that the method according to the present invention is applicable for both civil and military applications.

According to a further embodiment of the present invention there is provided another method of aerial screening of a land or sea region. In a first step, a plurality of collapsible flying wings is provided in a collapsed state on an airborne platform. Then, the plurality of unmanned aerial vehicles are dropped from the airborne platform whilst at the same time unfolding into an operational state, to enable each of the plurality of unmanned aerial vehicles for air-borne operation. Finally, the plurality of unmanned aerial vehicles navigates to screen the region.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof, which would occur to persons skilled in the art upon reading the foregoing description.

What is claimed is:

1. An autonomous flying wing comprising at least two substantially rigid wing portions arranged substantially symmetrically about a center portion having a longitudinal axis, each substantially rigid wing portion being pivotally attached to each adjoining portion such that said substantially rigid wing portions are rotatable in a plan perpendicular to said longitudinal axis to be foldable for storage and openable for deployment.

2. An autonomous flying wing comprising at least two wing portions arranged substantially symmetrically about a center portion, each wing portion being pivotally attached to each adjoining portion such that said wing portions are foldable for storage and openable for deployment, further comprising at least two additional wing portions such that all four wing portions are substantially rigid and are arranged substantially symmetrically about said center.

3. An unmanned aerial vehicle comprising:
   a central portion having a longitudinal axis and a front, a front portion, a medial portion an aft portion and an aft along said longitudinal axis; and
   at least two deployable wing elements being pivotally connected one on each side of said central portion, said deployable wing elements being rotatable in a plane perpendicular to said longitudinal axis to be openable from a collapsed undeployed state, in which they are inoperative, to an extended deployed state, in which they are operative, wherein said deployable wing elements are rigid.

4. An autonomous flying wing according to claim 1, comprising an automatic deployment device operable to automatically unfold said wing portions upon deployment.

5. An autonomous flying wing according to claim 4, wherein said automatic deployment device comprises at least one actuator operable to rotate said wing portions about said pivotal connections.

6. An unmanned aerial vehicle comprising:
a central portion having a longitudinal axis and a front, a front portion, a medial portion an aft portion and an aft along said longitudinal axis; and
at least two deployable wing elements being pivotally connected one on each side of said central portion, said deployable wing elements being rotatable in a plane perpendicular to said longitudinal axis to be openable from a collapsed undeployed state, in which they are inoperative, to an extended deployed state, in which they are operative, wherein said deployable wing elements are rigid.

7. An autonomous flying wing according to claim 1, further comprising a controller for controlling the flight thereof, the autonomous flying wing for being borne in a deployable manner by a mother aircraft to a deployment zone, the wing being connectable via a data link to an input device in said mother aircraft such that the controller is preprogrammable from said mother aircraft whilst being borne to said deployment zone.

8. An autonomous flying wing according to claim 7, comprising a central portion and at least two wing portions, each wing portion being pivotally attached to each adjoining portion such that said wing portions are foldable for storage and openable for deployment.

9. An autonomous flying wing according to claim 7, wherein the data link is a wireless data link.

10. An autonomous flying wing according to claim 9, wherein the wireless data link is any one of a group comprising an infra-red link, an RF link and a microwave link.

11. An autonomous flying wing according to claim 7, the wing being stored as one of a plurality of flying wings in a storage device mounted on said mother aircraft, the data link comprising an addressing unit operable to address each flying wing independently.

12. An autonomous flying wing according to claim 7, wherein said processor is operable to arrange data from said input device into a mission plan for said flying wing.

13. An autonomous flying wing according to claim 1, further comprising a rear mounted propulsion unit.

14. An autonomous flying wing according to claim 13, wherein said rear mounted propulsion unit is electrically powered.

15. An autonomous flying wing according to claim 14, further comprising storage batteries for said electrically mounted propulsion unit, said storage batteries being mounted on said substantially rigid wing portions.

16. An autonomous flying wing according to claim 1, further comprising only two steering surfaces.

17. An autonomous flying wing according to claim 1, further comprising a sensing transducer for communicating with a flying wing deployment unit bearing said flying wing.

18. An autonomous flying wing according to claim 3, further comprising a rear mounted propulsion unit.

19. An autonomous flying wing according to claim 18, wherein said rear mounted propulsion unit is electrically powered.

20. An autonomous flying wing according to claim 19, further comprising storage batteries for said electrically mounted propulsion unit, said storage batteries being mounted on said substantially rigid wing portions.

21. An autonomous flying wing according to claim 3, further comprising only two steering surfaces.

22. An autonomous flying wing according to claim 3, further comprising a sensing transducer for communicating with a flying wing deployment unit bearing said flying wing.

* * * * *